United States Patent
Wenhart (10) Patent No.: US 12,389,155 B2
(45) Date of Patent: Aug. 12, 2025

(54) SYSTEMS AND METHODS FOR FACILITATING IMPLEMENTATION OF A MUSICIAN PERFORMANCE MODE BY A HEARING DEVICE

(71) Applicant: SONOVA AG, Staefa (CH)

(72) Inventor: Teresa Wenhart, Zürich (CH)

(73) Assignee: Sonova AG, Staefa (CH)

( * ) Notice: Subject to any disclaimer, the term of this patent is extended or adjusted under 35 U.S.C. 154(b) by 262 days.

(21) Appl. No.: 18/127,308

(22) Filed: Mar. 28, 2023

(65) Prior Publication Data
US 2024/0334110 A1 Oct. 3, 2024

(51) Int. Cl.
| | | |
|---|---|---|
| H04R 1/00 | (2006.01) |
| G06F 3/16 | (2006.01) |
| G10H 1/00 | (2006.01) |
| G10H 1/06 | (2006.01) |
| H04R 1/10 | (2006.01) |
| H04R 25/00 | (2006.01) |

(52) U.S. Cl.
CPC ........... *H04R 1/1041* (2013.01); *G06F 3/165* (2013.01); *G10H 1/0008* (2013.01); *G10H 2210/031* (2013.01); *H04R 25/505* (2013.01); *H04R 2225/41* (2013.01); *H04R 2460/07* (2013.01)

(58) Field of Classification Search
None
See application file for complete search history.

(56) References Cited

U.S. PATENT DOCUMENTS

| | | | |
|---|---|---|---|
| 8,213,640 B2 | 7/2012 | Chalupper et al. |
| 10,796,684 B1* | 10/2020 | Tang ................. G10K 11/17827 |
| 2008/0044040 A1 | 2/2008 | Werner et al. |
| 2010/0067713 A1 | 3/2010 | Boschung et al. |
| 2021/0195347 A1* | 6/2021 | Boretzki ................. H04R 25/70 |
| 2021/0248983 A1* | 8/2021 | Balassanian ........... G06N 3/044 |
| 2022/0021992 A1 | 1/2022 | Popovac et al. |
| 2022/0312126 A1* | 9/2022 | Rosenthal ............... H04R 25/30 |
| 2022/0398063 A1* | 12/2022 | Dumas ........................ G06F 3/16 |
| 2023/0022947 A1* | 1/2023 | Won ........................ G10H 1/0008 |

FOREIGN PATENT DOCUMENTS

| | | | | |
|---|---|---|---|---|
| EP | 3107314 A1 * | 12/2016 | .......... H04R 25/407 |
| EP | 3945729 A1 | 2/2022 |

* cited by examiner

*Primary Examiner* — Qin Zhu
(74) *Attorney, Agent, or Firm* — ALG Intellectual Property, LLC (57) ABSTRACT

An exemplary method includes a hearing system determining, while a hearing device is operating according to a musician performance mode, an input sound classification associated with sound in an environment while a user of the hearing device is participating in a musical performance, selecting, based on the input sound classification, a first musician sound processing pattern from a plurality of musician sound processing patterns, and directing the hearing device to process the sound in accordance with the first musician sound processing pattern.

19 Claims, 7 Drawing Sheets

SYSTEMS AND METHODS FOR FACILITATING IMPLEMENTATION OF A MUSICIAN PERFORMANCE MODE BY A HEARING DEVICE

BACKGROUND INFORMATION

Hearing devices (e.g., hearing aids) are used to improve the hearing capability and/or communication capability of users of the hearing devices. Such hearing devices are configured to process a received input sound signal (e.g., ambient sound) and provide the processed input sound signal to the user (e.g., by way of a receiver (e.g., a speaker) placed in the user's ear canal or at any other suitable location).

Conventional hearing devices typically implement universal sound processing programs to provide good universal coverage and address known hearing problems. In addition, conventional hearing devices may offer dedicated sound processing programs (e.g., static setups) for scenarios that are otherwise not covered by the universal sound processing programs. For example, conventional hearing devices may be equipped with sound scene classifiers that apply sound type specific gains to input sound and assign default strengths for additional hearing device features such as sound cleaners and/or frequency lowering.

These approaches may work to address most hearing problems that users of hearing devices may encounter. However, musicians (e.g., people that make vocal or instrumental music as professionals or amateurs) and/or people that work in music-related professions (e.g., tone technicians, sound engineers, producers, etc.) have unique hearing needs that cannot be solved in a satisfactory way through either a universal sound processing program approach or by a dedicated sound processing program (e.g., a static setup) approach. Moreover, conventional hearing devices may transition between sound processing programs depending on the context of a user's environment. However, such transitions are typically too slow in a music-related setting, which may result in a user of a hearing device missing important seconds of instructions, missing music playing, and/or generally experiencing bad sound quality. Accordingly, there remains room to improve the manner in which hearing devices process sound for musicians and/or people in music-related professions.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION

Systems and methods for facilitating implementation of a musician performance mode by a hearing device are described herein. As will be described in more detail below, an exemplary system may comprise a memory storing instructions and a processor communicatively coupled to the memory and configured to execute the instructions to perform a process. The process may comprise determining, while a hearing device is operating according to a musician performance mode, an input sound classification associated with sound in an environment while a user of the hearing device is participating in a musical performance, selecting, based on the input sound classification, a first musician sound processing pattern from a plurality of musician sound processing patterns, and directing the hearing device to process the sound in accordance with the first musician sound processing pattern.

By using systems and methods such as those described herein, it may be possible to facilitate a user of a hearing device more easily perceiving sound in a music-related environment. For example, systems and methods such as those described herein may be optimized for hearing device users (e.g., musicians) that are participating in a musical performance to address needs of those users that are specific to a musical performance context. To that end, systems and methods such as those described herein may be configured to implement a musician performance mode to process sound in an environment during a musical performance. By implementing a musician performance mode, systems and methods such as those described herein may be optimized to support speech detection/perception (e.g., instructions provided by a director, a composer, etc.), music (e.g., orchestra, band, etc.) detection/perception, vocal music (e.g., choir) detection/perception, and/or comfort in noise ("CiN") (e.g., during applause) features that may be specific to or otherwise associated with a musical performance context. In addition, systems and methods such as those described herein may facilitate rapid classification of sound in the environment during a musical performance and/or rapid switching between sound processing patterns during the musical performance. Moreover, systems and methods such as those described herein may provide one or more graphical user interface views to facilitate a user selecting and/or customizing various options that may be used to individualize implementation of a musician performance mode for that user. Other benefits of the systems and methods described herein will be made apparent herein.

Figure 1:
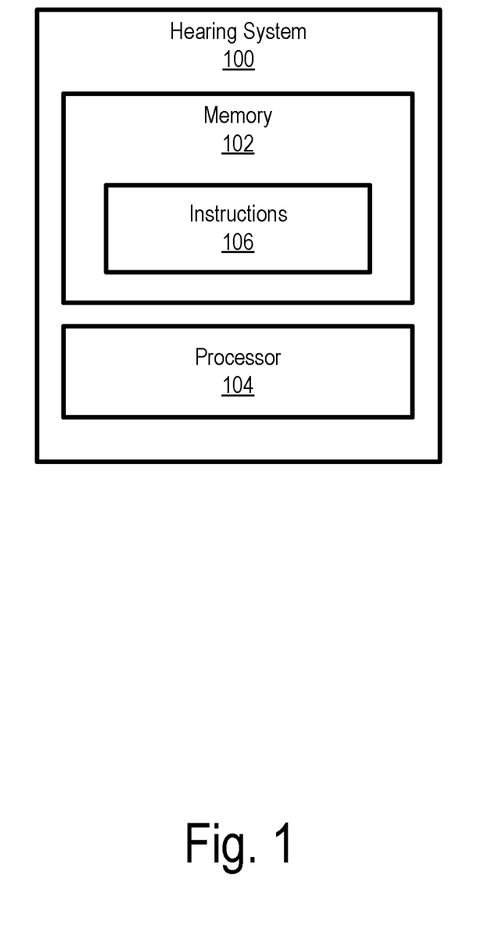
FIG. 1 illustrates an exemplary hearing system that may be implemented according to principles described herein.

FIG. 1 illustrates an exemplary hearing system 100 ("system 100") that may be implemented according to principles described herein. As shown, system 100 may include, without limitation, a memory 102 and a processor 104 selectively and communicatively coupled to one another. Memory 102 and processor 104 may each include or be implemented by hardware and/or software components (e.g., processors, memories, communication interfaces, instructions stored in memory for execution by the processors, etc.). In some examples, memory 102 and/or processor 104 may be implemented by any suitable computing device such as described herein. In other examples, memory 102 and/or processor 104 may be distributed between multiple devices and/or multiple locations as may serve a particular implementation. Illustrative implementations of system 100 are described herein.

Memory 102 may maintain (e.g., store) executable data used by processor 104 to perform any of the operations described herein. For example, memory 102 may store instructions 106 that may be executed by processor 104 to perform any of the operations described herein. Instructions 106 may be implemented by any suitable application, software, code, and/or other executable data instance.

Memory 102 may also maintain any data received, generated, managed, used, and/or transmitted by processor 104. Memory 102 may store any other suitable data as may serve a particular implementation. For example, memory 102 may store hearing loss profile data, user preference data, setting data, acoustic parameter data, machine learning data, input sound classification data, musician sound processing pattern data, geographic location data, music data (e.g., acoustic music content data, sheet music data, repertoire information, etc.), graphical user interface content, and/or any other suitable data.

Processor 104 may be configured to perform (e.g., execute instructions 106 stored in memory 102 to perform) various processing operations associated with implementing a musician sound processing mode. For example, processor 104 may perform one or more operations described herein to select, based on a determined input sound classification, a first musician sound processing pattern from a plurality of musician sound processing patterns to be applied by a hearing device during a musical performance. These and other operations that may be performed by processor 104 are described herein.

As used herein, a "hearing device" may be implemented by any device or combination of devices configured to provide or enhance hearing to a user. For example, a hearing device may be implemented by a hearing aid configured to amplify audio content to a recipient, a sound processor included in a cochlear implant system configured to apply electrical stimulation representative of audio content to a recipient, a sound processor included in a stimulation system configured to apply electrical and acoustic stimulation to a recipient, or any other suitable hearing prosthesis. In some examples, a hearing device may be implemented by a behind-the-ear ("BTE") housing configured to be worn behind an ear of a user. In some examples, a hearing device may be implemented by an in-the-ear ("ITE") component configured to at least partially be inserted within an ear canal of a user. In some examples, a hearing device may include a combination of an ITE component, a BTE housing, and/or any other suitable component.

In certain examples, hearing devices such as those described herein may be implemented as part of a binaural hearing system. Such a binaural hearing system may include a first hearing device associated with a first ear of a user and a second hearing device associated with a second ear of a user. In such examples, the hearing devices may each be implemented by any type of hearing device configured to provide or enhance hearing to a user of a binaural hearing system. In some examples, the hearing devices in a binaural system may be of the same type. For example, the hearing devices may each be hearing aid devices. In certain alternative examples, the hearing devices may be of a different type. For example, a first hearing device may be a hearing aid and a second hearing device may be a sound processor included in a cochlear implant system.

In some examples, a hearing device may additionally or alternatively include earbuds, headphones, hearables (e.g., smart headphones), and/or any other suitable device that may be used to facilitate a user perceiving sound during a musical performance. In such examples, the user may correspond to either a hearing impaired user or a non-hearing impaired user.

Figure 2:
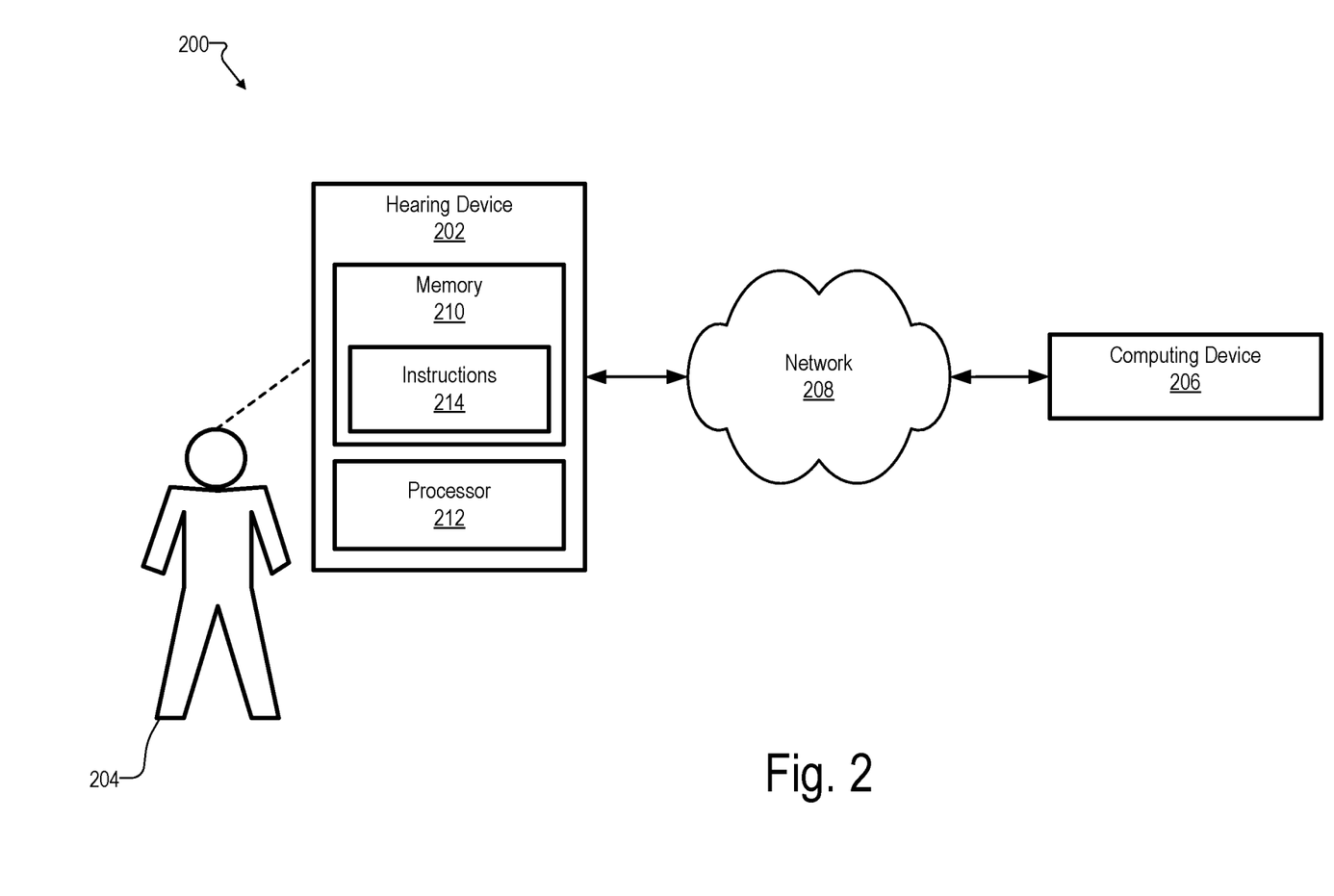
FIG. 2 illustrates an exemplary implementation of the hearing system of FIG. 1 according to principles described herein.

System 100 may be implemented in any suitable manner. For example, system 100 may be implemented by a hearing device and/or a computing device that is communicatively coupled in any suitable manner to the hearing device. To illustrate an example, FIG. 2 shows an exemplary implementation 200 in which system 100 may be provided in certain implementations. As shown in FIG. 2, implementation 200 includes a hearing device 202 that is associated with a user 204 and that is communicatively coupled to a computing device 206 by way of a network 208.

Hearing device 202 may correspond to any suitable type of hearing device such as described herein. Hearing device 202 may include, without limitation, a memory 210 and a processor 212 selectively and communicatively coupled to one another. Memory 210 and processor 212 may each include or be implemented by hardware and/or software components (e.g., processors, memories, communication interfaces, instructions stored in memory for execution by the processors, etc.). In some examples, memory 210 and processor 212 may be housed within or form part of a BTE housing. In some examples, memory 210 and processor 212 may be located separately from a BTE housing (e.g., in an ITE component). In some alternative examples, memory 210 and processor 212 may be distributed between multiple devices (e.g., multiple hearing devices in a binaural hearing system) and/or multiple locations as may serve a particular implementation.

Memory 210 may maintain (e.g., store) executable data used by processor 212 to perform any of the operations associated with hearing device 202. For example, memory 210 may store instructions 214 that may be executed by processor 212 to perform any of the operations associated with hearing device 202 assisting a user in hearing. Instructions 214 may be implemented by any suitable application, software, code, and/or other executable data instance.

Memory 210 may also maintain any data received, generated, managed, used, and/or transmitted by processor 212. For example, memory 210 may maintain any suitable data associated with a hearing loss profile of a user, input sound classifications, musician sound processing patterns, machine learning algorithms, and/or hearing device function data. Memory 210 may maintain additional or alternative data in other implementations.

Processor 212 is configured to perform any suitable processing operation that may be associated with hearing device 202. For example, when hearing device 202 is implemented by a hearing aid device, such processing operations may include monitoring ambient sound and/or representing sound to user 204 via an in-ear receiver. Processor 212 may be implemented by any suitable combination of hardware and software. In certain examples, processor 218 may correspond to or otherwise include one or more deep neural network ("DNN") chips configured to perform any suitable machine learning operation such as described herein.

User 204 may correspond to any individual that is a user of a hearing device and that is a participant in a musical performance. For example, user 204 may correspond to a player of an instrument (e.g., trumpet, cello, violin, guitar, drums, etc.) either solo on in a group (e.g., in a band, in an orchestra, etc.), a conductor/director/instructor of a musician or a group of musicians (e.g., of an orchestra), a conductor/director/instructor of a singer or group of singers, a singer in a group of singers, a solo singer, a technician (e.g., a tone technician, a sound engineer, etc.) working during a musical performance, or any other individual that may otherwise participate in an musical performance. As used herein, a "musical performance" may refer to any suitable situation where musical content may be performed or experienced by a user of a hearing device. For example, a musical performance may correspond to a concert, a rehearsal session for musicians, a music class, a vocal performance, an orchestral performance, a musical, a play, and/or any other suitable musical performance or combination thereof. As used herein, a "musician" may refer to an instrumentalist, a vocalist, and/or any other individual such as described herein that may otherwise participant in a musical performance.

Computing device 206 may include or be implemented by any suitable hardware and/or software components (e.g., processors, memories, communication interfaces, instructions stored in memory for execution by the processors, etc.) and may include any combination of computing devices as may serve a particular implementation. In certain examples, computing device 206 may be implemented by any suitable device that may be associated with a musical performance. In such examples, computing device 206 may correspond to a laptop computer, a desktop computer, a tablet computer, and/or any other suitable computing device that may be configured to facilitate implementing a musician performance mode. In such examples, computing device 206 may be configured to perform any suitable operations such as those described herein to optimize sound processing for user 204 by way of hearing device 202 during a musical performance.

Network 208 may include, but is not limited to, one or more wireless networks (Wi-Fi networks), wireless communication networks, mobile telephone networks (e.g., cellular telephone networks), mobile phone data networks, broadband networks, narrowband networks, the Internet, local area networks, wide area networks, and any other networks capable of carrying data and/or communications signals between hearing device 202 and computing device 206. In certain examples, network 208 may be implemented by a Bluetooth protocol (e.g., Bluetooth Classic, Bluetooth Low Energy ("LE"), etc.) and/or any other suitable communication protocol to facilitate communications between hearing device 202 and computing device 206. Communications between hearing device 202, computing device 206, and any other device/system may be transported using any one of the above-listed networks, or any combination or sub-combination of the above-listed networks.

System 100 may be implemented by computing device 206 or hearing device 202. Alternatively, system 100 may be distributed across computing device 206 and hearing device 202, or distributed across computing device 206, hearing device 202, and/or any other suitable computing system/device.

As mentioned, conventional hearing devices may be equipped with sound scene classifiers that apply sound type specific gains to input sound and assign default strengths for certain hearing device features. Such features may be useful for a broad range of hearing device users. However, hearing device users who are musicians make up a relatively small portion of the population (e.g., ~18% of the population for amateur musicians and ~1% of the population for professional musicians) and have very specific listening conditions and previously unmet needs while, for example, playing their instrument and/or singing during a musical performance. For example, music is often interrupted by verbal instructions (own voice and/or voices of others) during a musical performance. In addition, during a musical performance, voice sounds and/or music sounds may come from various different directions and the direction of the sound may change quickly. Further, there may be periods of silence, loud noises (e.g., clapping), or other interruptions during a musical performance that may occur frequently and suddenly. Furthermore, music from a user's own instrument may reach the limit of a hearing device quickly due to the close proximity of the instrument to a microphone of a hearing device. To address these issues, system 100 may be configured to facilitate implementation of a musician performance mode that is configured specifically for a musical performance context to address listening conditions and/or hearing needs such as those described herein that are specific to musicians. In this regard, system 100 may operate as a classifier that is specifically configured to classify sound in an environment while hearing device 202 operates according to a musician performance mode during a musical performance.

System 100 may facilitate hearing device 202 entering a musician performance mode in any suitable manner. In certain implementations, system 100 may cause hearing device 202 to enter a musician performance mode based on a user input provided by user 204. In such examples, system 100 may detect a user input (e.g., provided by way of an interface of hearing device 202 and/or computing device 206) selecting the musician performance mode. In certain examples, the user input may be provided by way of an application that is executed by computing device 206 and that provides one or more graphical user interface views to facilitate implementing a musician performance mode. Based on the user input, system 100 may direct hearing device 202 to enter the musician performance mode.

In certain alternative examples, hearing device 202 may automatically enter a musician performance mode upon satisfaction of a predefined condition. As used herein, the expression "automatically" means that an operation or a series of operations (e.g., entering a musician performance mode, switching musician sound processing patterns, exiting a musician performance mode, etc.) are performed without requiring any further input from user 204. For example, based on the satisfaction of the predefined condition, system 100 may direct hearing device 202 to switch from a standard sound processing mode to the musician performance mode.

Any suitable predefined condition may be used to trigger hearing device 202 implementing a musician performance mode as may serve a particular implementation. In certain examples, the predefined condition may correspond to a geographic location condition. Such a geographic location condition may define a geographic area where hearing device 202 is configured to automatically switch to the musician performance mode upon user 204 and hearing device 202 entering the geographic area. To that end, system 100 may be configured to detect a geographic location of user 204 of hearing device 202 in certain implementations. This may be accomplished in any suitable manner. For example, system 100 may use a global positioning system ("GPS") sensor of hearing device 202 and/or computing device 206 (e.g., a smartphone carried by user 204) to periodically or continually monitor the geographic location of user 204. System 100 may direct hearing device 202 to automatically enter the musician performance mode when the geographic location of user 204 or hearing device 202 corresponds to a predefined geographic location associated with a musical performance. To illustrate an example, a predefined geographic location may correspond to a music classroom where user 204 and other individuals practice their instruments and receive musical instruction. In such an example, system 100 may monitor the geographic location of user 204 to determine whether user 204 has entered the musical classroom. If system 100 determines that user 204 has entered the musical classroom, system 100 may direct hearing device 202 to automatically enter the musician performance mode.

Hearing device 202 may continue to operate in accordance with the musician performance mode while user 204 is within the predefined geographic location. In certain examples, system 100 may direct hearing device 202 to automatically switch from the musician performance mode to a standard sound processing mode upon detecting that user 204 has exited the predefined geographic location. Alternatively, system 100 may direct hearing device 202 to switch from the musician performance mode to a standard sound processing mode after expiration of a predefined amount of time or upon detection of a user input to turn off the musician performance mode.

Figure 3:
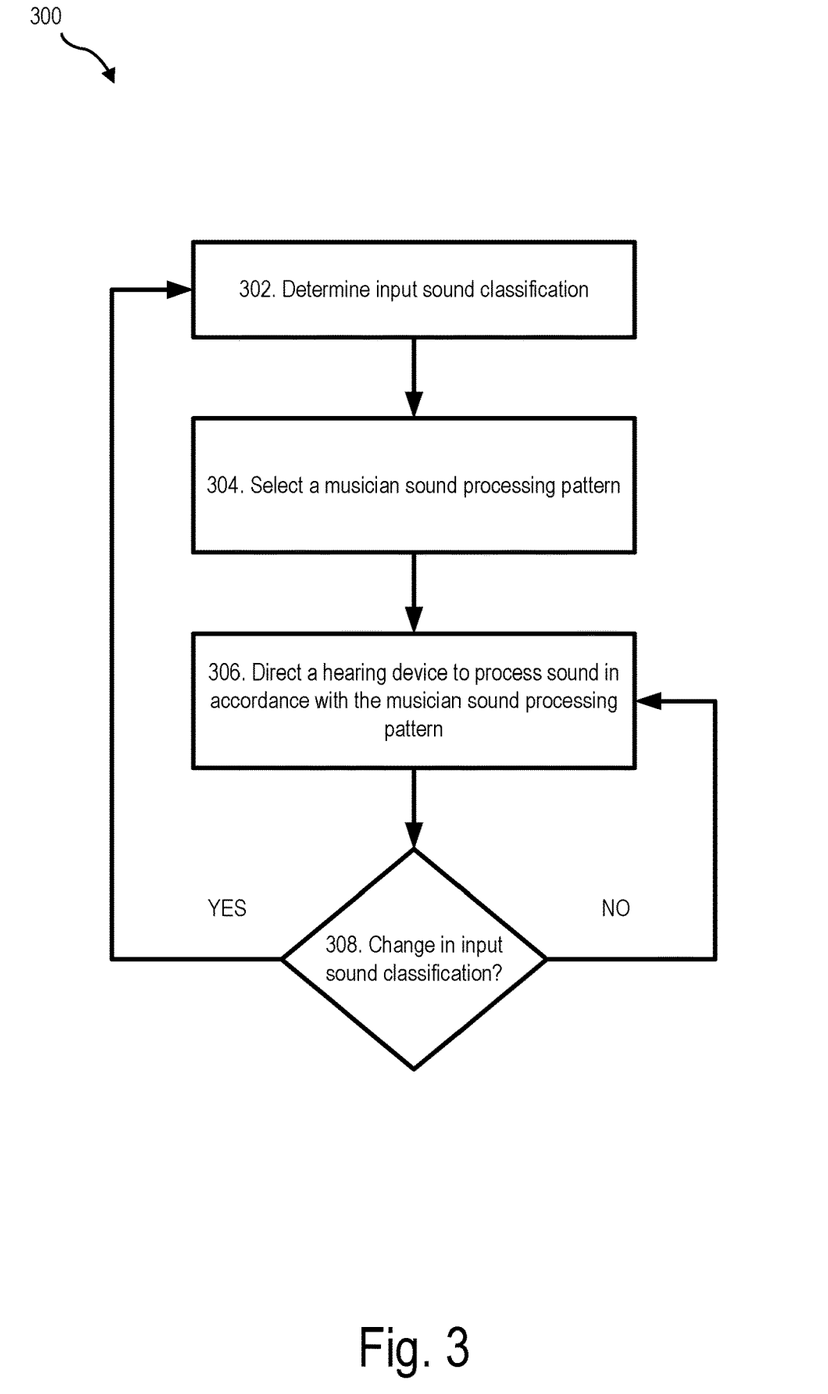
FIG. 3 illustrates an exemplary flow diagram that may be implemented according to principles described herein.

System 100 may implement a musician performance mode during a musical performance in any suitable manner. To illustrate, FIG. 3 shows an exemplary flow diagram 300 that depicts a flow of operations that may be performed by system 100 (e.g., hearing device 202 and/or computing device 206) to implement a musician performance mode. As shown in FIG. 3, at operation 302, system 100 may determine, while hearing device 202 is operating according to a musician performance mode, an input sound classification associated with sound in an environment while user 204 is participating in a musical performance. The input sound classification may correspond to any suitable classification that may be associated with sound in an environment during a musical performance. In certain examples, there may be a plurality of different input sound classifications that may be associated with sound in an environment during a musical performance. For example, there may be a first input sound classification, a second input sound classification, a third input sound classification, and so forth.

Each input sound classification may be associated with a different sound situation that may be experienced by user 204 during a musical performance. For example, a first input sound classification may correspond to a speech classification, a second input sound classification may correspond to a music classification, a third input sound classification may correspond to a CiN classification, a fourth input sound classification may correspond to an instrument classification (e.g., the own instrument of user 204 or an instrument played by another participant), a fifth input sound classification may correspond to a hybrid music and speech classification, and so forth.

System 100 may determine the input sound classification in any suitable manner. For example, system 100 may use a microphone of hearing device 202 to detect sound in the environment surrounding user 204 during the musical performance. Based on the detected sound, system 100 may determine whether the input sound classification corresponds, for example, to a speech classification, an own instrument classification, or any other suitable type of input sound classification such as those described herein.

In determining the input sound classification, system 100 may be trained to distinguish music, vocal music, and/or speech from background noise (e.g., clapping, stage noise, etc.). In certain examples, system 100 may be trained specifically for the needs of user 204 by artificial intelligence using any suitable machine learning methodology.

In certain examples, system 100 may be configured to predict when one or more input sound classifications may occur during the course of a musical performance. In so doing, system 100 may be configured to predict any suitable aspect that may be associated with a musical performance. For example, system may be configured to predict future loudness and/or dynamic range of portions of a musical performance, the start of music, the end of music, the start of speech, the end of speech, and/or any other suitable aspect of a musical performance. System 100 may make such predictions in any suitable manner. For example, system 100 may predict a repertoire of the musical performance based on any suitable information associated with the musical performance. For example, system 100 may use DNN learning, musical data databases, and/or any suitable artificial intelligence algorithm to predict the repertoire of the musical performance. By combining such methods of repertoire prediction with the use of hearing device 202, it may be possible to substantially increase the reliability and the speed of sound processing during a musical performance.

In certain examples, system 100 may predict the repertoire of the musical performance by analyzing acoustic music content in the environment during the musical performance. In such examples, system 100 may use any suitable music recognition program to determine what music is being played and/or performed and determine when different time segments of the musical performance may occur that may be associated with different input sound classifications. For example, system 100 may determine that a relatively loud orchestral number will be performed during a first time segment, a relatively quiet solo vocal number will be performed during a second time segment, a speech (e.g., instructions) will be performed during a third time segment during the musical performance. System 100 may then determine, based on the prediction, the appropriate input sound classification to use for each time segment.

In certain examples, system 100 may predict the repertoire of a musical performance by analyzing sheet music associated with the musical performance. In such examples, system 100 may be synchronized with, incorporated as part of, or otherwise be in communication with a sheet music application and/or page turner device that user 202 may use to view sheet music during the musical performance. For example, computing device 206 may correspond to a tablet computer that executes a sheet music application that displays sheet music for user 204 during the musical performance. System 100 may be configured to analyze the sheet music in any suitable manner to determine a current input sound classification associated with the musical performance and/or a prediction of one or more future input sound classifications that may occur during the course of the musical performance.

At operation 306, system 100 may select, based on the input sound classification, a first musician sound processing pattern from a plurality of musician sound processing patterns. Each musician sound processing pattern may define specific sound processing parameters and/or settings that are adapted for a specific input sound classification. For example, the first musician sound processing pattern may be specific to an instrument input sound classification where user 204 is playing, for example, a trumpet. In such an example, the first input sound processing pattern may define one or more specific settings/parameters that facilitate user 204 perceiving sound while playing the trumpet. The plurality of musician sound processing patterns may include any suitable number of musician sound processing patterns as may serve a particular implementation. For example, the plurality of musician sound processing parameters may include a first musician sound processing pattern, a second musician sound processing pattern, a third musician sound processing pattern, and so forth.

In certain examples, the specific number of sound processing patterns that may be implemented while hearing device 202 operates in the musician performance mode may be limited to no more than a predefined number. For example, in certain implementations, only two different possible musician sound processing patterns may be selectable by system 100 while hearing device 202 operates in accordance with the musician sound processing mode. In certain alternative implementations, only three different possible musician sound processing patterns may be selectable by system 100 while hearing device 202 operates in accordance with the musician sound processing mode. In certain alternative implementations, only four different possible musician sound processing patterns may be selectable by system 100 while hearing device 202 operates in accordance with the musician sound processing mode. In so doing, it may be possible to reduce the processing load that may be required to select between different sound processing patterns and as a result facilitate more quickly switching between musician sound processing patterns.

At operation 306, system 100 may direct hearing device 202 to process sound in accordance with the musician sound processing pattern selected at operation 304. This may be accomplished in any suitable manner. For example, system 100 may provide any suitable instruction signal to hearing device 202 that instructs hearing device 202 to begin processing sound during the musical performance in accordance with the selected musician sound processing pattern.

During the musical performance, the sound environment during the musical performance may change such that the musician sound processing pattern selected at operation 304 may not be optimal for the current sound environment. Accordingly, at operation 308, system 100 may determine whether there has been a change in the input sound classification or whether a change in the input sound classification is about to occur. If the answer at operation 308 is "NO," the flow may return to operation 306 and hearing device 202 may continue to operate in accordance with the musician sound processing pattern selected at operation 304. If the answer at operation 308 is "YES," the flow may return to operation 302 where system 100 may determine an additional input sound classification associated with the sound in the environment while the user of the hearing device is participating in the musical performance. System 100 may then repeat operation 304 and select a second musician sound processing program from the plurality of musician sound processing programs. System 100 may repeat operations 302-308 any suitable number of times to implement a musician performance mode.

The following illustrates an example of different musician sound processing patterns that may be selected by system 100 for application by hearing device 202 during the course of a musical performance. For example, system 100 may be configured to select a CiN musician sound processing pattern for hearing device 202 to apply during a set up phase of the musical performance (e.g., while user 204 sets up his/her instrument, while several instruments (own and others) are tuned and/or warmed up, while chairs and music stands are positioned (e.g., resulting in metal noise), and/or while people are talking). As soon as the situation gets calmer (e.g., where only speech and/or music are present), system 100 may select a hybrid music and speech musician sound processing pattern for hearing device 202 to apply instead of the CiN musician sound processing pattern. Such a hybrid music and speech musician sound processing pattern may use a beamformer feature and/or other features such that speech (e.g., instructions from a conductor) may be focused but music from any other location may be targeted with similar precedence if the music occurs. If there is music occurring for a longer period, especially if the music begins after a reasonable quiet period (concentration before a musical number begins, e.g., in a concert), system 100 may select a music specific musician sound processing pattern for hearing device 202 to apply instead of the hybrid music and speech musician sound processing pattern. During the course of the musical performance, system 100 may continue to select and direct hearing device 202 to apply any suitable number of different alternative musician sound processing patterns.

Figure 4:
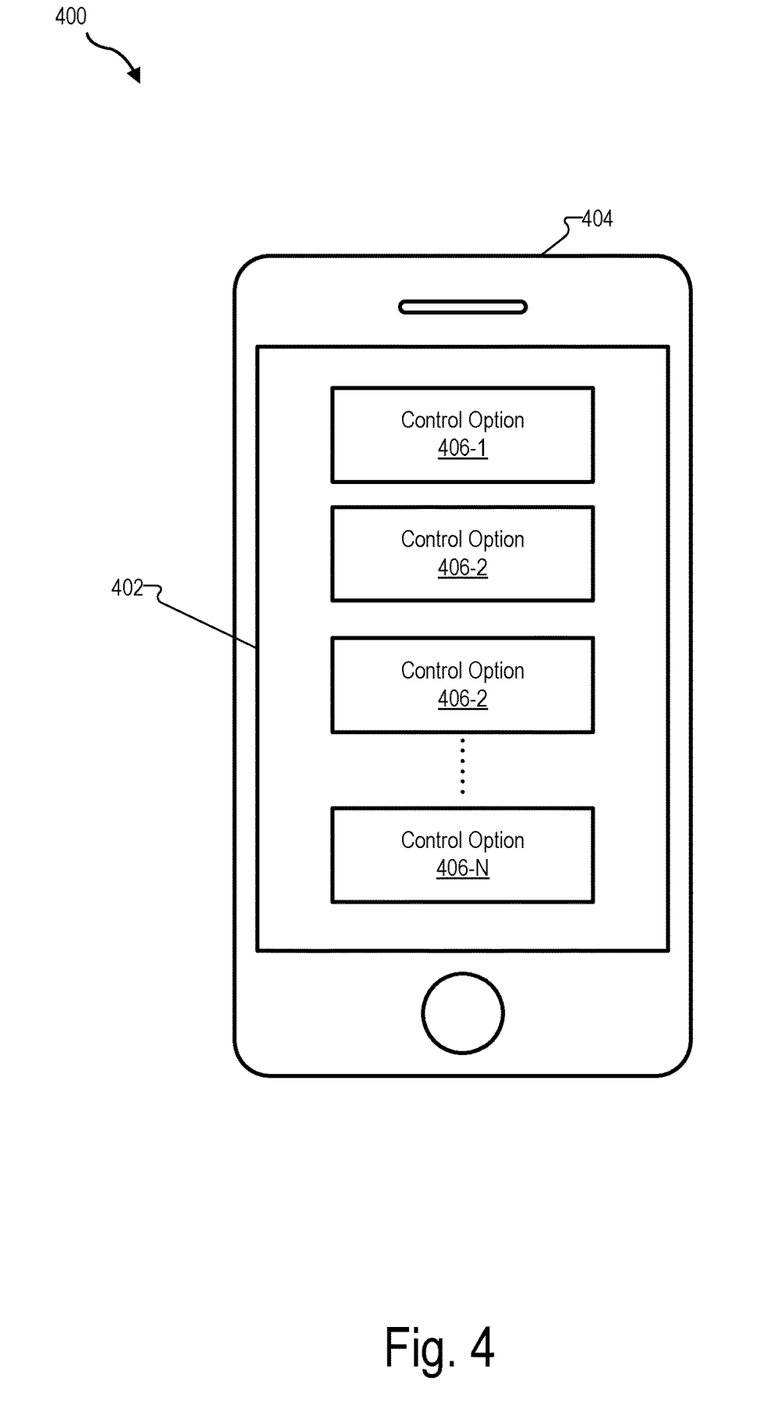
FIGS. 4-5 illustrate exemplary graphical user interface views that may be provided according to principles described herein.

In certain examples, system 100 may provide, for display to user 204 by way of a display device, a graphical user interface view that includes one or more user-selectable control options for individualized control of hearing device 202 while hearing device 202 is operating according to the musician performance mode. Such a graphical user interface view may be implemented in any suitable manner. To illustrate an example, FIG. 4 illustrates an exemplary implementation 400 of a graphical user interface view 402 that may be provided for display to user 204 by way of a smartphone 404 that may be implemented as computing device 206 in certain examples. As shown in FIG. 4, graphical user interface view 402 includes a plurality of user-selectable control options 406 (e.g., control options 406-1 through 406-N). Graphical user interface view 402 may include any suitable number of control options 406 as may serve a particular implementation. Control options 406 may correspond to any suitable setting, parameter, or information that may facilitate defining certain aspects of a musical performance and/or facilitate system 100 individualizing a musician performance mode for a particular user. For example, control options 406 may include, but are not limited to, a genre selection option, an instrument selection option, a group size option, a speech and music balance option, a sheet music synchronization option, an option to manually change directionality (e.g., of a beamformer), options to fine tune modifier or equalizer presets for different instruments, genres, and/or group settings, and/or any other suitable user-selectable option.

Figure 5:
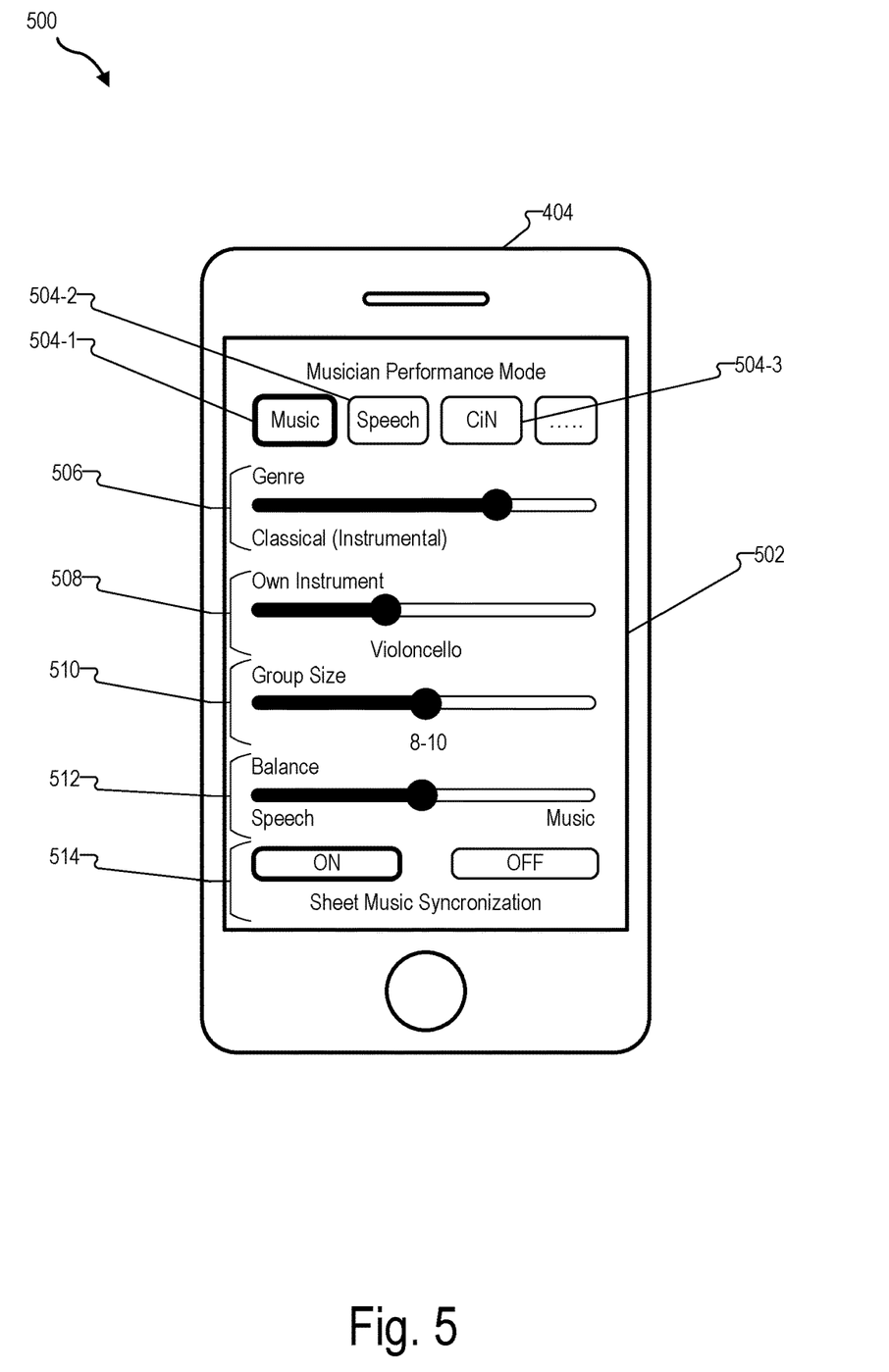

FIG. 5 shows an exemplary implementation 500 of another graphical user interface view 502 that may be provided for display to user 204 in certain implementations. As shown in FIG. 5, graphical user interface view 502 includes a plurality of classification options 504 (e.g., classification options 504-1 through 504-3) that may be selectable by user 204 to facilitate customizing how a musician performance mode is implemented for different classifications. In the example shown in FIG. 5, classification option 504-1 for "Music" is highlighted. As such, one or more of the control options represented within graphical user interface view 502 may be specific to a music specific input sound classification. It is understood that alternatively selecting classification option 504-2 for "Speech" or classification option 504-3 for "CiN" may result in different user-selectable control options being represented within graphical user interface view 502. Additional or alternative classification options 504 may be represented in graphical user interface view 502 in alternative implementations.

As shown in FIG. 5, graphical user interface view 502 includes a genre selection portion 506 that includes a slider and text indicating that the "Classical (Instrumental)" genre is currently selected. As an alternative to the "Classical (Instrumental)" genre, any other suitable genre may be selected or inputted into genre selection portion 506 as may serve a particular implementation. For example, jazz, rock, pop, rap, etc. may be indicated as the genre in genre selection portion 506 in certain alternative implementations. The slider represented in genre selection portion 506 may be manipulated to either increase or decrease the amount that music in the genre is represented to user 204 during the musical performance.

The type of instrument played by user 204 may affect how a musician sound processing pattern is applied during a musical performance. For example, relatively more attenuation may be provided when user 204 is playing drums than when user 204 is playing a harp. Accordingly, as shown in FIG. 5, graphical user interface view 502 further includes an own instrument selection portion 508 that includes a slider and text indicating what type of instrument user 204 is playing or intends to play during a musical performance. In the example shown in FIG. 5, "Violoncello" is indicated as the instrument used by user 202. However, any other suitable instrument may be designated within graphical user interface view 502 as may serve a particular implementation. For example, other own instrument options that may be selectable by user 204 may include a guitar, drums, a trumpet, a piano, a violin, a cello, own voice, or any other suitable instrument. The slider represented in own instrument selection portion 508 may be manipulated to either decrease or increase the amount that the selected instrument is represented to user 204 during the musical performance.

The size of the group during the musical performance may also affect how a musician sound processing pattern is applied. Accordingly, as shown in FIG. 5, graphical user interface view 502 further includes a group size selection portion 510 that includes a slider. The group size is currently indicated in FIG. 5 as being 8-10 group members. Moving the slider in group size selection portion 510 to the left may decrease the indicated number of group members whereas moving the slider to the right may increase the indicated number of group members.

As shown in FIG. 5, graphical user interface view 502 further includes a balance selection portion 512 that includes a slider. Moving the slider in balance selection portion 512 to the left may result in speech processing being emphasized more than music processing while hearing device 202 operates according to a musician performance mode. Moving the slider in balance selection portion 512 to the right may result in music processing being emphasized more than speech processing while hearing device 202 operates according to the musician performance mode.

As shown in FIG. 5, graphical user interface view 502 further includes a sheet music synchronization portion 514 where user 204 may select whether to turn off or on sheet music synchronization. In the example shown in FIG. 5, sheet music synchronization is currently "ON," indicating that system 100 is configured to analyze sheet music associated with the musical performance in any suitable manner and determine input sound classifications based on the analysis of the sheet music.

In certain examples, system 100 may be configured to facilitate an automatic earplug function as part of a musician sound processing pattern. For example, a music specific musician sound processing pattern to be applied by hearing device 202 may be specifically adapted for loud music. Certain portions of the loud music may have an amplitude that may cause discomfort to user 204 or even further hearing loss. Accordingly, the music specific musician sound processing pattern may be configured to automatically and dynamically implement an earplug function to ether fully or partially attenuate sound during those portions of the musical performance.

In certain examples, system 100 may additionally or alternatively be configured to implement a beamformer feature by way of hearing device 202 to facilitate a musician perceiving sound during a musical performance. Such a beamformer feature may be configured with high directivity to focus on speech and/or different music sound types during a musical performance. In addition, such a beamformer feature may be configured to quickly switch between different sources of information without switching between musician sound processing patterns.

In certain examples, system 100 may additionally or alternatively be configured to provide a streaming option to directly (e.g., by way of network 208) stream audio content from a computing device during a musical performance to hearing device 202. For example, audio content from a recording microphone/recording setup in a practice room or concert hall by be streamed directly to hearing device 202 during a musical performance.

The preceding disclosure describes implementing a musician performance mode by hearing devices of users (e.g., musicians, sound technicians, directors, etc.) that are participating in a musical performance. However, it is understood that concepts such as those described herein may also be applied in situations where a user of a hearing device is not directly participating in a musical performance. For example, concepts such as those described herein may also be used to facilitate an audience member's hearing device operating in accordance with a musician performance mode while the audience member experiences a musical performance.

Figure 6:
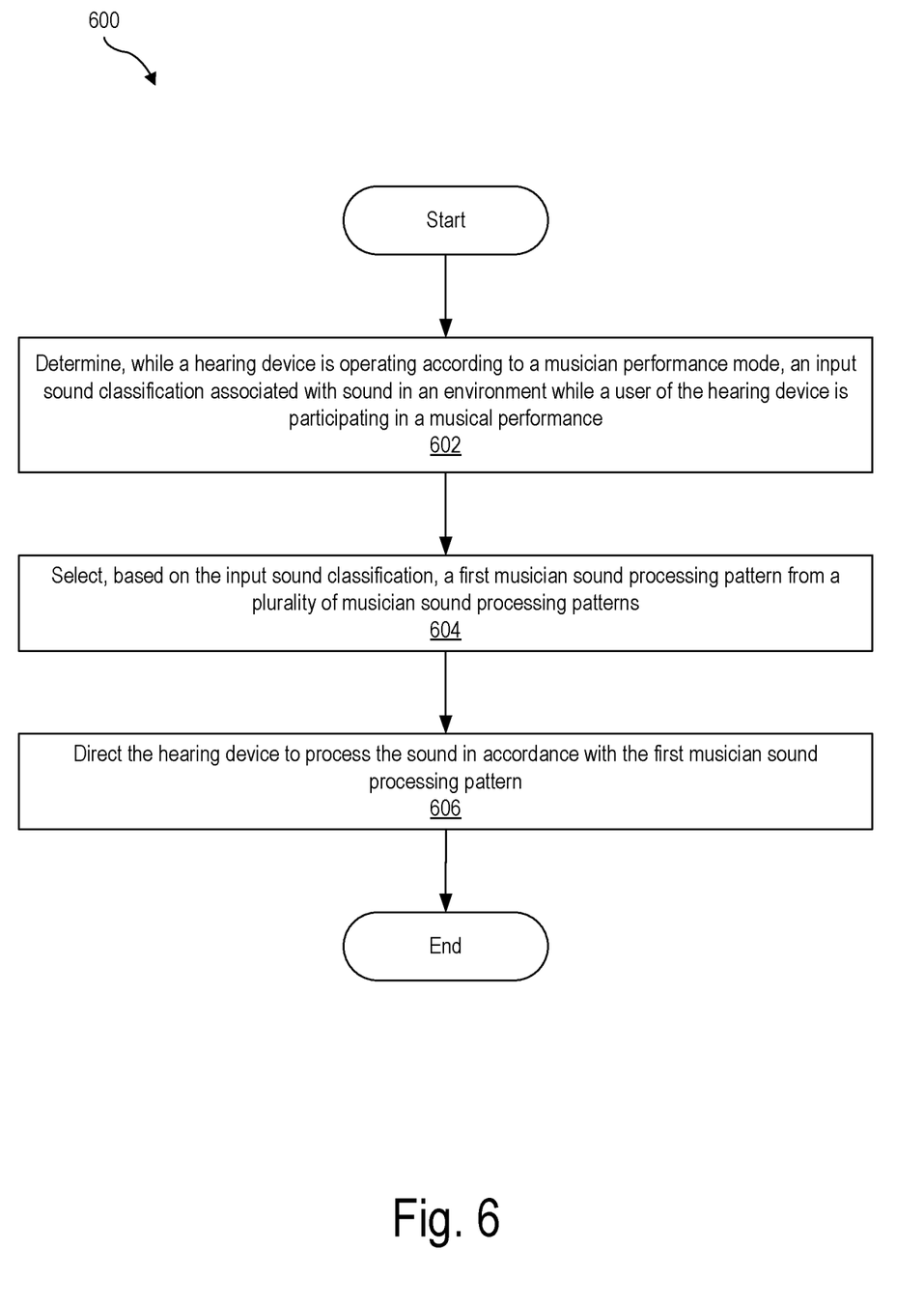
FIG. 6 illustrates an exemplary method according to principles described herein.

FIG. 6 illustrates an exemplary method 600 for facilitating implementation of a musician performance mode by a hearing device according to principles described herein. While FIG. 6 illustrates exemplary operations according to one embodiment, other embodiments may omit, add to, reorder, and/or modify any of the operations shown in FIG. 6. One or more of the operations shown in FIG. 6 may be performed by a hearing device such as hearing device 202, a computing device such as computing device 206, an additional computing device communicatively coupled to computing device 206 and/or hearing device 202, any components included therein, and/or any combination or implementation thereof.

At operation 602, a hearing system such as hearing system 100 may determine, while a hearing device is operating according to a musician performance mode, an input sound classification associated with sound in an environment while a user of the hearing device is participating in a musical performance. Operation 602 may be performed in any of the ways described herein.

At operation 604, the hearing system may select, based on the input sound classification, a first musician sound processing pattern from a plurality of musician sound processing patterns. Operation 604 may be performed in any of the ways described herein.

At operation 606, the hearing system may direct the hearing device to process the sound in accordance with the first musician sound processing pattern. Operation 606 may be performed in any of the ways described herein.

In some examples, a computer program product embodied in a non-transitory computer-readable storage medium may be provided. In such examples, the non-transitory computer-readable storage medium may store computer-readable instructions in accordance with the principles described herein. The instructions, when executed by a processor of a computing device, may direct the processor and/or computing device to perform one or more operations, including one or more of the operations described herein. Such instructions may be stored and/or transmitted using any of a variety of known computer-readable media.

A non-transitory computer-readable medium as referred to herein may include any non-transitory storage medium that participates in providing data (e.g., instructions) that may be read and/or executed by a computing device (e.g., by a processor of a computing device). For example, a non-transitory computer-readable medium may include, but is not limited to, any combination of non-volatile storage media and/or volatile storage media. Exemplary non-volatile storage media include, but are not limited to, read-only memory, flash memory, a solid-state drive, a magnetic storage device (e.g., a hard disk, a floppy disk, magnetic tape, etc.), ferroelectric random-access memory ("RAM"), and an optical disc (e.g., a compact disc, a digital video disc, a Blu-ray disc, etc.). Exemplary volatile storage media include, but are not limited to, RAM (e.g., dynamic RAM).

Figure 7:
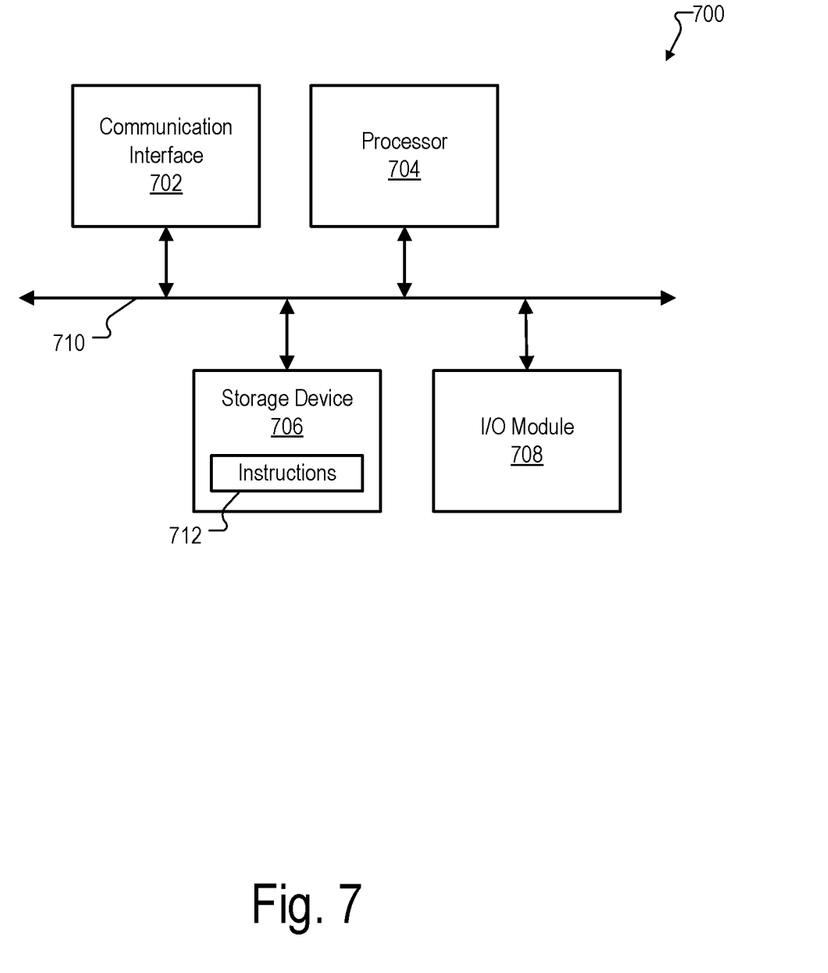
FIG. 7 illustrates an exemplary computing device according to principles described herein.

FIG. 7 illustrates an exemplary computing device 700 that may be specifically configured to perform one or more of the processes described herein. As shown in FIG. 7, computing device 700 may include a communication interface 702, a processor 704, a storage device 706, and an input/output ("I/O") module 708 communicatively connected one to another via a communication infrastructure 710. While an exemplary computing device 700 is shown in FIG. 7, the components illustrated in FIG. 7 are not intended to be limiting. Additional or alternative components may be used in other embodiments. Components of computing device 700 shown in FIG. 7 will now be described in additional detail.

Communication interface 702 may be configured to communicate with one or more computing devices. Examples of communication interface 702 include, without limitation, a wired network interface (such as a network interface card), a wireless network interface (such as a wireless network interface card), a modem, an audio/video connection, and any other suitable interface.

Processor 704 generally represents any type or form of processing unit capable of processing data and/or interpreting, executing, and/or directing execution of one or more of the instructions, processes, and/or operations described herein. Processor 704 may perform operations by executing computer-executable instructions 712 (e.g., an application, software, code, and/or other executable data instance) stored in storage device 706.

Storage device 706 may include one or more data storage media, devices, or configurations and may employ any type, form, and combination of data storage media and/or device. For example, storage device 706 may include, but is not limited to, any combination of the non-volatile media and/or volatile media described herein. Electronic data, including data described herein, may be temporarily and/or permanently stored in storage device 706. For example, data representative of computer-executable instructions 712 configured to direct processor 704 to perform any of the operations described herein may be stored within storage device 706. In some examples, data may be arranged in one or more databases residing within storage device 706.

I/O module 708 may include one or more I/O modules configured to receive user input and provide user output. I/O module 708 may include any hardware, firmware, software, or combination thereof supportive of input and output capabilities. For example, I/O module 708 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 708 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 708 is configured to provide graphical data to a display for presentation to a user. The graphical data may be representative of one or more graphical user interfaces and/or any other graphical content as may serve a particular implementation.

In some examples, any of the systems, hearing devices, computing devices, and/or other components described herein may be implemented by computing device 700. For example, memory 102 and/or memory 210 may be implemented by storage device 706, and processor 104 and/or processor 212 may be implemented by processor 704.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   determining, by a hearing system and while a hearing device is operating according to a musician performance mode, an input sound classification associated with sound in an environment while a user of the hearing device is participating in a musical performance during which live music content is experienced by the user of the hearing device;
   selecting, by the hearing system and based on the input sound classification, a first musician sound processing pattern from a plurality of musician sound processing patterns;
   predicting, by the hearing system, a repertoire of the musical performance; and
   directing, by the hearing system, the hearing device to process the sound in accordance with the first musician sound processing pattern and based on the repertoire of the musical performance.

2. The method of claim 1, further comprising:
   determining, by the hearing system and while the hearing device is processing the sound in accordance with the first musician sound processing pattern, an additional input sound classification associated with the sound in the environment while the user of the hearing device is participating in the musical performance;
   selecting, by the hearing system and based on the additional input sound classification, a second musician sound processing pattern from the plurality of musician sound processing patterns; and
   directing, by the hearing system, the hearing device to process the sound in accordance with the second musician sound processing pattern instead of the first musician sound processing pattern.

3. The method of claim 1, further comprising:
detecting, by the hearing system, a user input selecting the musician performance mode; and
directing, by the hearing system, the hearing device to enter to the musician performance mode based on the user input.

4. The method of claim 1, further comprising directing, by the hearing system, the hearing device to automatically enter the musician performance mode upon satisfaction of a predefined condition.

5. The method of claim 4, wherein:
the predefined condition is a geographic location condition, and
the method further comprises:
detecting, by the hearing system, a geographic location of the user of the hearing device; and
directing, by the hearing system, the hearing device to automatically enter the musician performance mode when the geographic location of the user corresponds to a predefined geographic location associated with the musical performance.

6. The method of claim 1, wherein:
the predicting of the repertoire comprises analyzing, by the hearing system, sheet music associated with the musical performance; and
the determining of the input sound classification is based on the analyzing of the sheet music.

7. The method of claim 1, wherein:
the predicting of the repertoire comprises analyzing, by the hearing system, acoustic music content in the environment during the musical performance; and
the determining of the input sound classification is based on the analyzing of the acoustic music content.

8. The method of claim 1, further comprising providing, by the hearing system and for display to the user by way of a display device, a graphical user interface view that includes one or more user-selectable control options for individualized control of the hearing device while the hearing device is operating according to the musician performance mode.

9. The method of claim 8, wherein the one or more user-selectable control options include one or more of a genre selection option, an instrument selection option, a group size option, a speech and music balance option, or a sheet music synchronization option.

10. A system comprising:
a memory that stores instructions; and
a processor communicatively coupled to the memory and configured to execute the instructions to perform a process comprising:
determining, while a hearing device is operating according to a musician performance mode, an input sound classification associated with sound in an environment while a user of the hearing device is participating in a musical performance during which live music content is experienced by the user of the hearing device;
selecting, based on the input sound classification, a first musician sound processing pattern from a plurality of musician sound processing patterns;
predicting a repertoire of the musical performance; and
directing the hearing device to process the sound in accordance with the first musician sound processing pattern and based on the repertoire of the musical performance.

11. The system of claim 10, wherein the process further comprises:
determining, while the hearing device is processing the sound in accordance with the first musician sound processing pattern, an additional input sound classification associated with the sound in the environment while the user of the hearing device is participating in the musical performance;
selecting, based on the additional input sound classification, a second musician sound processing pattern from the plurality of musician sound processing patterns; and
directing the hearing device to process the sound in accordance with the second musician sound processing pattern instead of the first musician sound processing pattern.

12. The system of claim 10, wherein the process further comprises:
detecting a user input selecting the musician performance mode; and
directing the hearing device to enter to the musician performance mode based on the user input.

13. The system of claim 10, wherein the process further comprises directing the hearing device to automatically enter the musician performance mode upon satisfaction of a predefined condition.

14. The system of claim 10, wherein the process further comprises providing, for display to the user by way of a display device, a graphical user interface view that includes one or more user-selectable control options for individualized control the hearing device while the hearing device is operating according to the musician performance mode.

15. A computer program product embodied in a non-transitory computer readable storage medium and comprising computer instructions for performing a process comprising:
determining, while a hearing device is operating according to a musician performance mode, an input sound classification associated with sound in an environment while a user of the hearing device is participating in a musical performance during which live music content is experienced by the user of the hearing device;
selecting, based on the input sound classification, a first musician sound processing pattern from a plurality of musician sound processing patterns;
predicting a repertoire of the musical performance; and
directing the hearing device to process the sound in accordance with the first musician sound processing pattern and based on the repertoire of the musical performance.

16. The computer program product of claim 15, wherein the process further comprises:
determining, while the hearing device is processing the sound in accordance with the first musician sound processing pattern, an additional input sound classification associated with the sound in the environment while the user of the hearing device is participating in the musical performance;
selecting, based on the additional input sound classification, a second musician sound processing pattern from the plurality of musician sound processing patterns; and
directing the hearing device to process the sound in accordance with the second musician sound processing pattern instead of the first musician sound processing pattern.

17. The computer program product of claim 15, wherein the process further comprises:
detecting a user input selecting the musician performance mode; and directing the hearing device to enter to the musician performance mode based on the user input.

18. The computer program product of claim 15, wherein the process further comprises directing the hearing device to automatically enter the musician performance mode upon satisfaction of a predefined condition.

19. The computer program product of claim 15, wherein the process further comprises providing, for display to the user by way of a display device, a graphical user interface view that includes one or more user-selectable control options for individualized control the hearing device while the hearing device is operating according to the musician performance mode.

\* \* \* \* \*